(12) United States Patent
Saidi

(10) Patent No.: US 10,431,060 B2
(45) Date of Patent: Oct. 1, 2019

(54) VIRTUAL REALITY SYSTEMS

(71) Applicant: Arm Limited, Cambridge (GB)

(72) Inventor: Ali Saidi, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/002,788

(22) Filed: Jun. 7, 2018

(65) Prior Publication Data

US 2018/0357865 A1 Dec. 13, 2018

(30) Foreign Application Priority Data

Jun. 9, 2017 (GB) ..................................... 1709207

(51) Int. Cl.
| | |
|---|---|
| *G08B 7/06* | (2006.01) |
| *B08B 17/00* | (2006.01) |
| *G06T 11/60* | (2006.01) |
| *G06F 3/01* | (2006.01) |
| *G08B 5/22* | (2006.01) |
| *G08B 21/02* | (2006.01) |
| *G08B 17/00* | (2006.01) |

(52) U.S. Cl.
CPC .............. *G08B 7/066* (2013.01); *G06F 3/011* (2013.01); *G06T 11/60* (2013.01); *G08B 5/228* (2013.01); *G08B 17/00* (2013.01); *G08B 21/02* (2013.01)

(58) Field of Classification Search
CPC .......... G08B 7/066; G08B 17/00; G08T 11/60

USPC ................. 340/539.1, 539.11, 539.13, 573.1
See application file for complete search history.

(56) References Cited

U.S. PATENT DOCUMENTS

| | | | |
|---|---|---|---|
| 2010/0079356 A1 | 4/2010 | Hoellwarth | |
| 2012/0050140 A1 | 3/2012 | Border et al. | |
| 2016/0282618 A1 | 9/2016 | Kon et al. | |
| 2018/0047212 A1* | 2/2018 | Long | ................ G08B 13/19684 |

FOREIGN PATENT DOCUMENTS

| | | |
|---|---|---|
| EP | 2661097 A2 | 11/2013 |
| EP | 3007038 A2 | 4/2016 |
| WO | 2017031089 A1 | 2/2017 |

OTHER PUBLICATIONS

United Kingdom Combined Search and Examination Report dated Nov. 21, 2017 on related Application No. GB 1709207.3, filed Jun. 9, 2017.

\* cited by examiner

*Primary Examiner* — Daryl C Pope
(74) *Attorney, Agent, or Firm* — EIP US LLP

(57) ABSTRACT

Measures, including methods, systems, processors and computer programs, for use in operating a virtual reality user device. A change in a real world environment in which a user of the virtual reality user device is physically located is detected. In response to the detection, an alert mechanism is initiated at the virtual reality user device to alert the user of the change detected in the real world environment.

19 Claims, 2 Drawing Sheets

VIRTUAL REALITY SYSTEMS

CROSS-REFERENCE TO RELATED APPLICATIONS

This application claims priority to United Kingdom Application No. GB 1709207.3, filed Jun. 9, 2017, under 35 U.S.C. § 119(a). The above-referenced patent application is incorporated by reference in its entirety.

BACKGROUND OF THE INVENTION

Field of the Invention

The present disclosure relates to virtual reality systems. In particular, but not exclusively, the present disclosure relates to operating a virtual reality user device.

Description of the Related Technology

Known virtual reality systems have a capability which measures physical dimensions of the real world environment in which a user of the virtual reality system is located. When a user turns on and begins to use such a virtual reality system, a scanning device (for example using transmission and reception of infrared radiation) of the system scans the real world environment (for example a room in a building) in which the user is currently located in order to determine its physical dimensions. The user is likely to move around the real world environment whilst using the virtual reality system, so the virtual reality system keeps track of where the user is physically located in relation to the measured real world environment dimensions. If the user approaches a wall or other limit of the real world environment, the system warns the user so that the user can avoid bumping into or otherwise colliding with the wall.

SUMMARY

According to a first aspect, there is provided a method of operating a virtual reality user device, the method comprising: detecting a change in a real world environment in which a user of the virtual reality user device is physically located; and in response to the detection, initiating an alert mechanism at the virtual reality user device to alert the user of the change detected in the real world environment.

According to a second aspect, there is provided apparatus for use in processing data for a virtual reality user device, the apparatus comprising at least one memory including computer program code, and at least one processor in data communication with the at least one memory, wherein the at least one processor is configured to: detect a change in a real world environment in which a user of the virtual reality user device is physically located; and in response to the detection, initiate an alert mechanism at the virtual reality user device to alert the user of the change detected in the real world environment.

According to a third aspect, there is provided a computer program comprising a set of instructions, which, when executed by a computerised device, cause the computerised device to perform a method of: detecting a change in a real world environment in which a user of a virtual reality user device is physically located; and in response to the detection, initiating an alert mechanism at the virtual reality user device to alert the user of the change detected in the real world environment.

According to a fourth aspect, there is provided a virtual reality system, the system comprising one or more sensors and a virtual reality user device, wherein the one or more sensors are configured to: detect a change in a real world environment in which a user of the virtual reality user device is physically located; and notify the virtual reality user device of the detected change, wherein the virtual reality user device is configured to, in response to the notification, initiate an alert mechanism at the virtual reality user device to alert the user of the change detected in the real world environment.

According to a fifth aspect, there is provided a graphics processor configured to, at a virtual reality headset: detect a change in a real world environment in which a user of the virtual reality headset is located; and render a predetermined virtual object in a virtual reality world being provided to the user of the virtual reality headset to notify the user of the change detected in the real world environment.

According to a sixth aspect, there is provided a method of operating a communication device, the method comprising: providing, via a virtual reality provision capability of the communication device, a virtual reality environment to a user of the communication device; detecting a change in a real world environment in which the user of the communication device is physically located; and in response to the detection, initiating an alert mechanism in the virtual reality environment being provided to the user of the communication device to alert the user of the change detected in the real world environment.

Embodiments comprise a non-transitory computer-readable storage medium comprising computer-executable instructions which, when executed by a processor, cause a computing device to perform a method according to any of the above method aspects.

Further features and advantages of embodiments will become apparent from the following description of preferred embodiments, given by way of example only, which is made with reference to the accompanying drawings.

DETAILED DESCRIPTION OF CERTAIN INVENTIVE EMBODIMENTS

Figure 1:
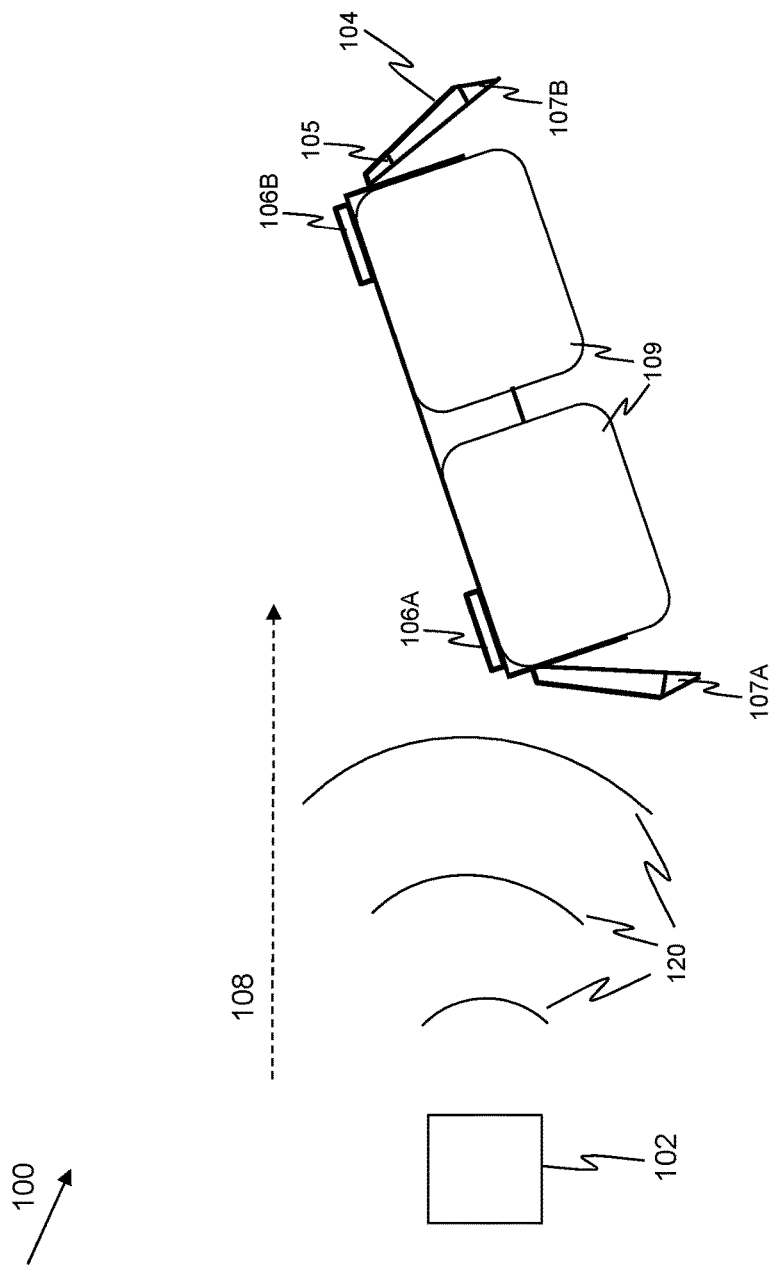
FIG. 1 shows an example system 100 according to embodiments of the present disclosure.

FIG. 1 shows an example system 100 according to embodiments of the present disclosure. System 100 comprises a virtual reality user device 104 and an entity 102.

In the example embodiments of FIG. 1, virtual reality user device 104 comprises a headset which can be worn by a user (not shown). In this example, virtual reality user device 104 comprises two sensors 106A and 106B, but in other examples could have a different number of sensors. One or more of sensors 106A and 106B may for example comprise a light sensor, a video capture device (for example a video camera), a microphone, a smell detector, a smoke detector, and a temperature sensor.

Virtual reality user device 104 comprises one or more processors and one or more memories 105 which are capable of performing various data processing operations including data processing for graphical, video and audio rendering. Element 105 may comprise one or more graphics processing units (GPUs).

Virtual reality user device 104 comprises a graphical user interface 109 capable of outputting graphical and/or video signals rendered by one or more processors 105. In the example of FIG. 1, graphical user interface 109 is shown as two lens-shaped portions, but in other examples could comprise a single portion or part(s) thereof.

Virtual reality user device 104 comprises one or more audio channel loudspeakers 107A, 107B capable of outputting audio signals rendered by one or more processors 105. Virtual reality user device 104 may comprise single or multiple audio channel pickup functionality via one or more microphones (for example in the form of sensors 106A and 106B).

Virtual reality user device 104 comprises one or more electrical power sources (not shown), such as batteries or cells, for providing power to components of virtual reality user device 104. Alternatively, virtual reality user device 104 could obtain power via a cable connected to an electrical socket or other electrical device (not shown).

Entity 102 comprises an object (or part of an object) or being that is capable of undergoing a change of some form which is detectable by one or more of sensors 106A and 106B of virtual reality user device 104. The change may for example be a visible change, an audible change or a change in smell. When a change occurs in entity 102 one or more waves, particles and/or signals 120 propagate away from entity 102 in a direction 108 towards virtual reality user device 104 where the waves, particles and/or signals 120 are detected by one or more sensors 106A and 106B of virtual reality user device 104.

Embodiments of the present disclosure comprise measures, for example methods, systems, processors and computer programs, for use in operating a virtual reality user device, such as virtual reality device 104 depicted in FIG. 1.

A change in a real world environment in which a user of virtual reality user device 104 is physically located is detected. In response to the detection, virtual reality user device 104 initiates an alert mechanism at virtual reality user device 104 to alert the user of the change detected in the real world environment.

In embodiments, virtual reality user device 104 comprises one or more sensors (for example one or more of sensors 106A and 106B) and the detected change is detected by the one or more sensors of virtual reality user device 104.

Once the user of virtual reality user device 104 is alerted of the change detected in the real world environment according to embodiments, the user is able to react accordingly. If the user of virtual reality user device 104 is not alerted of the change in the real world environment according to embodiments, the user may continue to be immersed (or otherwise distracted) in the virtual world provided by virtual reality user device 104 regardless, which may compromise the safety of the user of virtual reality user device 104 and/or other beings in the real world.

Embodiments of the present disclosure provide a detection mechanism for an emergency situation in the real world that causes an action to be taken in a virtual reality world. In embodiments, the change detected in the real world environment is associated with an emergency situation occurring in the real world. For example, in a fully immersive virtual reality world, the user may not realize that a smoke alarm is going off in a real world room that they are currently located in. Embodiments described herein cause the virtual reality system to detect this situation and take remedial action, for example either shutting down the virtual reality system or duplicating the warning within the immersive virtual reality environment.

Embodiments of the present disclosure also provide a detection mechanism for non-emergency situations in the real world in relation to which an action by a user of a virtual reality user device may be desirable, for example opening a real world door when a doorbell is ringing or answering a real world landline telephone which is ringing, etc.

In some embodiments, the initiating comprises turning off virtual reality user device 104. In other embodiments, the initiating comprises causing a change in graphical user interface 109 of virtual reality user device 104.

Embodiments comprise a virtual reality system having a sound and light detection system. The detection system can look for the pattern of light strobes from a fire alarm and/or the sound pattern associated with a fire alarm. Once the emergency situation is detected, the virtual reality can be immediately shut down or the virtual reality system can show the user the warning or mimic the warning sounds/lights in the virtual world being presented to the user. In embodiments, virtual reality system can switch off an appropriate component of the virtual reality system, for example disabling (possibly temporarily) the sound being produced by virtual reality user device so that the user can hear a sound from the real world.

In embodiments, the initiating comprises rendering a predetermined virtual object in a virtual reality environment being provided to the user of the virtual reality user device. The predetermined virtual object may for example comprise a graphical object rendered on graphical user interface 109. The predetermined virtual object may for example comprise an audio object rendered via one or more of audio channel loudspeakers 107A, 107B.

In embodiments, the initiating comprises causing a change in a virtual reality environment being provided to the user of virtual reality user device 104. In some such embodiments, the change caused in the virtual reality environment comprises a default change in the virtual reality environment. Such a default change may be the same, regardless of the change that has been detected in the real world. Before using virtual reality user device 104, the user may be informed of the default change in the virtual reality environment so that if the default change occurs in the virtual reality environment, the user will know something has happened in the real world that may require their attention and/or require them to take action in the real world.

In embodiments, the change caused in the virtual world environment imitates the change detected in the real world environment. As one example, if the change detected in the real world environment comprises the sound of a fire alarm, the change caused in the virtual world environment may imitate the sound of the fire alarm in the virtual reality environment (for example via one or more of audio channel loudspeakers 107A, 107B). As another example, if the change detected in the real world environment comprises one or more flashing lights of a fire alarm, the change caused in the virtual world environment may imitate the one or more flashing lights of the fire alarm in the virtual reality environment (for example via graphical user interface 109.)

In embodiments, the change detected in the real world environment comprises detection of a predetermined audio pattern. In some such embodiments, the predetermined audio pattern is associated with an audible alarm pattern. The predetermined audio pattern may for example be associated with one or more of a fire alarm, a smoke alarm, an animal making a noise, a human making a noise, a doorbell, a phone ringing and a vehicle horn. In terms of an animal making a noise, this may involve a dog barking at the user of virtual reality user device 104. In terms of a human making a noise, this may involve a baby carrying in the vicinity of the user of virtual reality user device 104. In some embodiments, virtual reality user device 104 records a sound occurring in the real world and to alert the user, plays a recording of the sound to the user via loudspeakers 107A, 107B of virtual reality user device.

In embodiments, the change detected in the real world environment comprises detection of a predetermined visual pattern. In some such embodiments, the predetermined visual pattern is associated with a visual alarm pattern.

In embodiments, the change detected in the real world environment comprises detection of a predetermined smell. In some such embodiments, the predetermined smell is associated with a fire.

In some embodiments, the user of virtual reality user device 104 is being provided with a fully immersive virtual reality environment by virtual reality user device 104 such that the user is not able to detect the change in the real world environment themselves. In other embodiments, the user of virtual reality user device 104 is being provided with an at least partly immersive virtual reality environment by virtual reality user device 104 and the change detected in the real world environment is detected in an immersive part of the virtual reality environment such that the user is not able to detect the change in the real world environment themselves.

The latter situation in the preceding paragraph may occur where for example virtual reality user device comprises a communication device such as a mobile (or 'cellular') phone (for example a smartphone with virtual reality provision capabilities) and the user holds the mobile phone up in front of their eyes. Here, the user is immersed in the virtual reality environment at least for areas of the real world located behind the mobile phone which the user cannot see (due to the fact that the mobile phone is blocking the user's view of those areas). Conversely, the user is not immersed in the virtual reality environment at least for areas of the real world located to the side of the mobile phone because the user can still see those areas (due to the fact that the mobile phone is not blocking the user's view of those areas).

In embodiments, the change detected in the real world environment comprises a change that has occurred since the user was immersed in a virtual reality environment provided by virtual reality device 104. Before using virtual reality user device 104, the user is still 'present' in the real world (i.e. not immersed in a virtual world) so is able to detect changes in the real world and react appropriately in the real world as they would normally (without use of embodiments).

Figure 2:
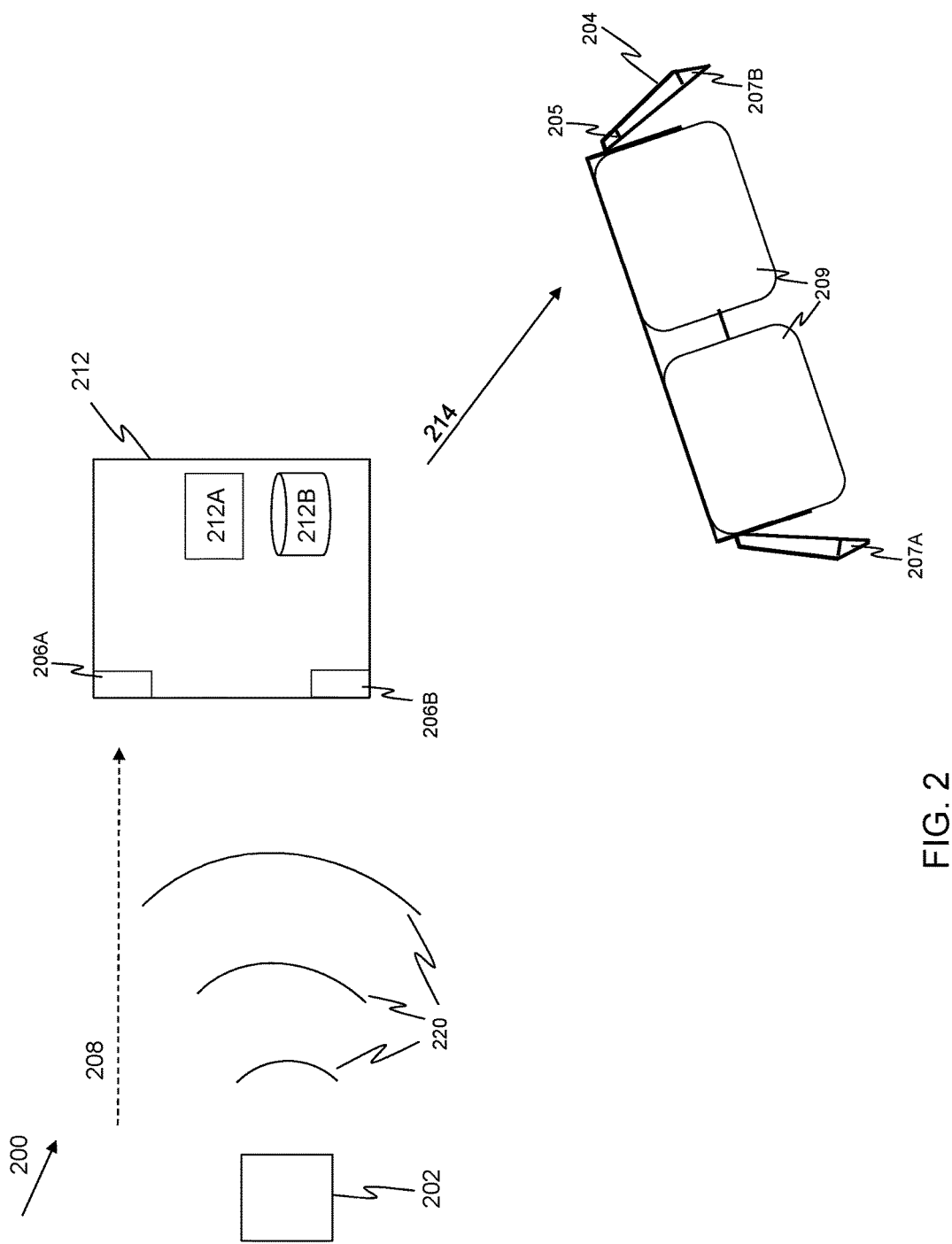
FIG. 2 shows an example system 200 according to embodiments of the present disclosure.

FIG. 2 shows an example system 200 according to embodiments of the present disclosure. System 200 comprises a number of elements in common with system 100 of FIG. 1, where similar elements are similarly numbered, but with labels incremented by 100.

System 200 comprises a device 212 remote to virtual reality user device. Device 212 may for example comprise a smart device such as a smart smoke alarm or smart fire alarm or a server or other device associated with a smoke alarm or fire alarm system. Device 212 may comprise a computing device such as a personal computer or set-top box connected to virtual reality user device 204 by a cable or a wireless connection.

In the embodiments of FIG. 2, instead of virtual reality user device 204 comprising one or more sensors, device 212 comprises one or more sensors (in this case sensor 206A and sensor 206B). Device 212 comprises one or more processors 212A and one or more memories 212B which are capable of performing various data processing operations according to embodiments.

In the embodiments depicted in FIG. 2, when a change occurs in relation to entity 202, the change is detected by one or more sensors 206A, 206B. One or more sensors 206A, 206B are located on device 212, not virtual reality user device 204, so one or more sensors 206A, 206B are considered to be remote to virtual reality user device 204. Upon detection of the change by one or more sensors 206A, 206B, processor 212A of device 212 causes the detected change to be notified to virtual reality user device 201 via a communication channel 214. In some embodiments, communication channel 214 comprises a wireless communication channel. In other embodiments, communication channel 214 comprises a wired communication channel. Communication channel may pass directly via 'line-of-sight' between device 212 and virtual reality user device 204, or may pass via one or more networks or parts of networks (not shown).

Notification of the detected change from device 212 to virtual reality user device 204 may take the form of any of a number of notification mechanisms known in the art, for example a push notification message, a Short Message Service (SMS) message, a Multimedia Messaging Service (MMS) message, a Session Initiation Protocol (SIP) message. In such embodiments, both device 212 and virtual reality user device 204 comprise appropriate wired/wireless transceiver components (not shown) in order to handle such notification messaging.

Upon start-up, virtual reality user device 204 may perform one or more search and connect (or 'pairing') procedures in order to be able to communicate with (including receive notification messages from) device 212. The notification messaging may be conducted for example via a Bluetooth low energy (BLE) protocol, a Radio-Frequency Identification (RFID) protocol, or a WiFi (IEEE 802.11x) protocol where device 212 and virtual reality user device 204 are configured accordingly to communicate via such.

Embodiments comprise a virtual reality system 200. The system comprises one or more sensors and a virtual reality user device 204. The one or more sensors are configured to detect a change in a real world environment in which a user of virtual reality user device 204 is physically located and notify virtual reality user device 204 of the detected change. Virtual reality user device 204 is configured to, in response to the notification, initiate an alert mechanism at virtual reality user device 204 to alert the user of the change detected in the real world environment.

In some embodiments, the one or more sensors are located remote from virtual reality user device 104, for example sensors 206A, 206B in device 212. In other embodiments, the one or more sensors are integral to virtual reality user device 204. In some embodiments, both device 212 and virtual reality user device 204 comprise sensors, and changes in the real world may be detected either by sensors located in device 212, by sensors in virtual reality user device 204, or by sensors located in device 212 as well in sensors located in virtual reality user device 204.

Embodiments comprise a graphics processor (for example element 105 or part of element 105) configured to, at a virtual reality headset detect a change in a real world environment in which a user of the virtual reality headset is located and render a predetermined virtual object in a virtual reality world being provided to the user of the virtual reality headset to notify the user of the change detected in the real world environment.

Embodiments comprise a method of controlling a communication device (for example a mobile phone (or 'cellular', or 'smartphone'). The method comprises providing, via a virtual reality provision capability of the communication device, a virtual reality environment to a user of the communication device. A change in a real world environment in which the user of the communication device is physically located is detected. In response to the detection, an alert mechanism in the virtual reality environment being provided to the user of the communication device is initiated to alert the user of the change detected in the real world environment.

According to embodiments, one or more devices comprise a processor or processing system. In embodiments, the processing system comprises one or more processors and/or memory. In embodiments, the processing system comprises one or more GPUs. Each device as described in relation to any of the embodiments described above may similarly comprise a processor and/or processing system. One or more of the aspects of the embodiments described herein with reference to the drawings comprise processes performed by a virtual reality user device 104, 204. In embodiments, virtual reality user device 104, 204 comprises one or more processing systems or processors configured to carry out these processes, as depicted by elements 105, 205. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples of the present disclosure. Further embodiments are envisaged.

Various embodiments described herein depict one entity 102 which may undergo a detectable change or changes. In other embodiments, there may be more than one entity that undergoes a change and/or an entity which undergoes more than one change and each of these changes can be detected and notified to the user of a virtual reality user device simultaneously or sequentially. One such example may involve flashing lights on a fire alarm being detected as well as sound from a separate smoke alarm being detected, and the user of a virtual reality user device is alerted to both the flashing lights as well as the sound occurring in the real world via two separate alert mechanisms or a combined alert mechanism initiated via the virtual reality user device and virtual world presented to the user.

Some embodiments are described above in relation to a virtual reality environment. Such virtual reality environment embodiments can also be applied in an augmented reality environment and vice versa, or a combination of the two environments.

Some embodiments described above involve a virtual reality device in the form of a headset. Embodiments can equally be applied in other forms of virtual reality devices for example integral to a mobile telephone device, a tablet computing device, a watch, a helmet or suchlike.

In some embodiments, the virtual reality device comprises an audio interface but does not comprise a graphical user interface. For example, the virtual reality device may be in the form of a set of earphones, headphones or the like. In such embodiments, the virtual reality device may render one or more audio features of a virtual object in the virtual reality environment without rendering one or more visual features.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of operating a virtual reality user device comprising one or more sensors, the method comprising:
   detecting, by the one or more sensors of the virtual reality user device, a change in a real world environment in which a user of the virtual reality user device is physically located; and
   in response to the detection, initiating an alert mechanism at the virtual reality user device to alert the user of the change detected in the real world environment.

2. A method according to claim 1, wherein the initiating comprises turning off the virtual reality user device.

3. A method according to claim 1, wherein the initiating comprises causing a change in a graphical user display of the virtual reality user device.

4. A method according to claim 1, wherein the initiating comprises rendering a predetermined virtual object in a virtual reality environment being provided to the user of the virtual reality user device.

5. A method according to claim 1, wherein the initiating comprises causing a change in a virtual reality environment being provided to the user of the virtual reality user device.

6. A method according to claim 5, wherein the change caused in the virtual reality environment comprises a default change in the virtual reality environment.

7. A method according to claim 5, wherein the change caused in the virtual reality environment imitates the change detected in the real world environment.

8. A method according to claim 7, wherein the change detected in the real world environment comprises the sound of a fire alarm and the change caused in the virtual world environment imitates the sound of the fire alarm in the virtual reality environment.

9. A method according to claim 1, wherein the change detected in the real world environment comprises detection of a predetermined audio pattern.

10. A method according to claim 9, wherein the predetermined audio pattern is associated with one or more of:
    a fire alarm,
    a smoke alarm,
    an animal making a noise,
    a human making a noise,
    a doorbell,
    a phone ringing, and
    a vehicle horn.

11. A method according to claim 1, wherein the change detected in the real world environment comprises detection of a predetermined visual pattern.

12. A method according to claim 1, wherein the change detected in the real world environment comprises detection of a predetermined smell.

13. A method according to claim 1, wherein the user of the virtual reality user device is being provided with a fully immersive virtual reality environment by the virtual reality user device such that the user is not able to detect the change in the real world environment themselves.

14. A method according to claim 1, wherein the change detected in the real world environment is associated with an emergency situation occurring in the real world.

15. A method according to claim 1, wherein the detected change is detected by one or more sensors remote to the virtual reality user device and notified to the virtual reality user device by the one or more remote sensors via a communication channel.

16. A method according to claim 1, wherein at least one of the one or more sensors comprises one or more of:
   a light sensor,
   a video capture device,
   a microphone,
   a smell detector,
   a smoke detector, and
   a temperature sensor.

17. A method according to claim 1, wherein the virtual reality user device comprises a headset.

18. A virtually reality user device comprising:
   one or more sensors; and
   apparatus for use in processing data for the virtual reality user device, the apparatus comprising at least one memory including computer program code, and at least one processor in data communication with the at least one memory, wherein the at least one processor is configured to:
      detect, by the one or more sensors, a change in a real world environment in which a user of the virtual reality user device is physically located; and
      in response to the detection, initiate an alert mechanism at the virtual reality user device to alert the user of the change detected in the real world environment.

19. A virtual reality system, the system comprising one or more sensors and a virtual reality user device, wherein the one or more sensors are integral to the virtual reality user device,
   wherein the one or more sensors are configured to:
      detect a change in a real world environment in which a user of the virtual reality user device is physically located; and
      notify the virtual reality user device of the detected change,
   wherein the virtual reality user device is configured to, in response to the notification, initiate an alert mechanism at the virtual reality user device to alert the user of the change detected in the real world environment.

* * * * *